US005350548A

United States Patent [19]

Hinzpeter et al.

[11] Patent Number: 5,350,548

[45] Date of Patent: Sep. 27, 1994

[54] METHOD AND APPARATUS FOR MAKING TWO-LAYER TABLETS IN A TWIN ROTOR PRESSING MACHINE

[75] Inventors: Jürgen Hinzpeter; Ingo Schmidt, both of Schwarzenbek; Helmut Brommrowitz, Mölln, all of Fed. Rep. of Germany

[73] Assignee: Wilhelm Fette GmbH, Schwarzenbek, Fed. Rep. of Germany

[21] Appl. No.: 67,635

[22] Filed: May 26, 1993

[30] Foreign Application Priority Data

Jun. 2, 1992 [DE] Fed. Rep. of Germany ....... 4218122

[51] Int. Cl.[5] ............................................ B29C 43/20

[52] U.S. Cl. .................................. 264/40.4; 264/113; 425/140; 425/141; 425/345; 425/353

[58] Field of Search ...................... 264/40.4, 109, 113, 264/123; 425/140, 344, 345, 352, 353, 141

[56] References Cited

U.S. PATENT DOCUMENTS 2,944,493 7/1960 Bailey et al. .
3,063,390 11/1962 Frank ................................ 425/345
3,158,109 11/1964 Stott .
4,452,570 6/1984 Janson ................................ 425/140
4,999,151 3/1991 Hinzpeter ........................... 264/40.4
5,158,728 10/1992 Sanderson et al. ................ 264/113
5,213,738 5/1993 Hampton et al. .................. 264/113

FOREIGN PATENT DOCUMENTS 2251832 10/1972 Fed. Rep. of Germany .

OTHER PUBLICATIONS

Derwent Abstract of DE 22 51 832.

*Primary Examiner*—Allan R. Kuhns
*Attorney, Agent, or Firm*—Vidas, Arrett & Steinkraus

[57] ABSTRACT

A method of making two-layer tablets or pellets in a twin rotor pressing machine, in which method during a normal manufacturing period powdery or particulate material is fed into die bores of a die rotor so as to form first layers, said first layers are compressed in a first step by plungers synchronously rotating with the die rotor so as to form first layer pressed articles, the two layers within the die bores are compressed in a second step by said plungers so as to obtain two-layer tablets or pellets, and said two-layer tablets or pellets are removed at a main discharge station, and in which method during an inspection period first layer pressed articles removed at an intermediate discharge station or two-layer tablets or pellets removed at said main discharge station are fed to an inspection station, characterized in that during the inspection period said first layers are compressed more than in said first step during the normal manufacturing period before samples thereof are withdrawn at said intermediate discharge station, and in that the second layers are compressed and the resulting second layer pressed articles are fed either to a scrap path or to said inspection station at least after removal of said samples of the first layer pressed articles.

8 Claims, 4 Drawing Sheets

METHOD AND APPARATUS FOR MAKING TWO-LAYER TABLETS IN A TWIN ROTOR PRESSING MACHINE

FIELD OF THE INVENTION

The present invention relates to a method of making two-layer tablets or pellets in a twin rotor pressing machine.

Twin rotor pressing machines for making tablets of a great variety of materials and for a great variety of applications are generally known. A disc-shaped die rotor rotatable generally about a vertical axis includes circumferentially spaced die bores, each receiving a pair of reciprocable compression plungers rotating synchronously with said die rotor. Actuation of said plungers is obtained via cams and compression rollers.

BACKGROUND OF THE INVENTION

During loading of the die bores by suitable loadings means the lower plunger of each pair of plungers forms the bottom of a diecavity, with its extent in the die bore providing the desired metering of the powdery or particulate material. The opposite plungers of each pair of plungers are moved towards each other at a compression station so as to compress the powdery or particulate material to obtain tablets or pellets of a desired thickness. The compression station generally includes precompression and main compression means. After the compression operation, the lower plungers as controlled by an injection cam eject the tablets or pellets from the die bores at a predetermined location of the pressing machine while the upper plungers progressively move away from the die rotor. This allows a stripper to strip off the ejected pressed articles from the die rotor and to feed them to a discharge path.

It is necessary to inspect among other properties the weight of the tablets manufactured in this manner and eventually to provide for correction of the weight if it is not within desired limits. To this end the discharge path may include switch means for selectively branching off the tablets towards an inspection station. Inspection stations which automatically perform inspection procedures are also known.

Tablets or pellets that are made up of two-layers may be manufactured by means of a twin rotor pressing machine of the above-identified type wherein the described stations are provided two-fold. Initially, powdery or particulate material is loaded within the die bores and are slightly precompressed so as to form first layers. Thereafter, powdery or particulate material is loaded onto said first layers so as to form second layers thereon. The first and second layers are compressed so as to form two-layer tablets or pellets which are removed in the above described manner. If the inspection indicates that the actual weight of the two-layer tablets or pellets deviates from a desired value, it is not recognizable whether it is the first, the second, and/or both layers that are faulty. Accordingly, it is necessary to inspect the weight also of the first layers. In the past, this has been done manually. The first layers are removed manually, and the loading means arranged upstream of said second compression station has made been inoperative and has been moved away from the die rotor by hydraulic actuation means.

The prior art method does not enable completely automatic operation but rather requires manual operation at least for drawing samples of the first layers.

Another drawback of the prior art method is that uncompressed powdery or particulate material may collect on the disk-shaped die rotor and the adjacent areas of the pressing machine. Loss of material and/or intermixing of the first layer material and the second layer material may result therefrom. Further, repeated cleaning of the pressing machine is required.

SUMMARY OF THE INVENTION

It is an object of the present invention to provide a method and an apparatus for making two-layer tablets or pellets by compression of powdery or particulate materials, which is of simple design, which enables an automatic drawing of samples and which avoids the collecting of residual material in the die bores or on the die rotor or in other areas of the pressing machine.

The present invention is a method of making two-layer tablets or pellets in a twin rotor pressing machine, in which method during a normal manufacturing period powdery or particulate material is fed into die bores of die rotor so as to form first layers, said first layers are compressed in a first step by plungers synchronously rotating with the die rotor so as to form first layer pressed articles, the two layer within the die bores are compressed in a second step by said plungers so as to obtain two-layer tablets or pellets, and said two-layer tablets or pellets are removed at a main discharge station, and in which method during an inspection period first layer pressed articles removed at an intermediate discharge station or two-layer tablets or pellets removed at said main discharge station are fed to an inspection station. The method of the invention is characterized in that during the inspection period, the first layers are compressed more than in said first step during the normal manufacturing period before samples thereof are withdrawn at said intermediate discharge station, and in that the second layers are compressed and the resulting second layer pressed articles are led either to a scrap path or to said inspection station at least after removal of said samples of the first layer pressed articles.

In a further aspect, the invention comprises a twin rotor pressing machine including a die rotor adapted to be rotated and including a plurality of die bores, each receiving a pair of reciprocable plungers, a first loading station at the periphery of the die rotor for feeding powdery or particulate material into said die bores, a first compression station for compressing the powdery or particular material within said die bores by means of said plungers so as to form first layers pressed articles, an intermediate discharge station adapted to discharge first-layer pressed articles, a second loading station for feeding powdery or particulate material into said die bores so as to form second layers adjacent said first layers, a second compression station for compressing said first and second layers so as to form two-layer tablets or pellets, ejection and discharge stations for ejecting and discharging said two-layer tablets or pellets, said plunger being adapted to be actuated from opposite sides of said die rotor by means of compression rollers mounted so as to be displaceable towards and away from said plungers by adjustment means, said intermediate discharge station includes adjustable ejection cam means, stripper means and two-way switch means arranged to discharge said first-layer pressed articles during the inspection period selectively either to the scrap path or to the inspection station. This machine is useful in performing the method of the invention.

In the method of the present invention, the first layers which are to be withdrawn as samples are compressed to a higher degree than in the precompression step of the normal manufacturing process. The present invention is based on the fact that during manufacturing of two-layer tablets the first layers are only slightly precompressed and have not yet obtained the hardness of the final tablets. Otherwise, interconnection of the two layers by diecompression would not be possible. The final thickness of the two-layer tablets is obtained in the second compression station wherein the tablets are compressed so as to obtain the desired density and hardness. If in the prior art method the first layers are withdrawn when they are only slightly compressed, they are relatively soft so that particles will crumble off of the first layer pressed articles. This is why in the method of the present invention the first layers are compressed substantially more than in the precompression step of the normal manufacturing process before they are withdrawn as samples so that the first layers are of a structure similar to that of the finished tablets and may be handled in a similar manner. Accordingly, the present invention allows automatic withdrawal of the pressed first layers in the same manner as this is done with respect to the finished tablets so that they may be fed to automatic inspection means.

In the method of the present invention the material for the second layers may still be loaded during the inspection period, i.e. the second loading means will be operative also during the withdrawal of samples. At this time, the second layer pressed articles are discharged into a scrap path from where they may be refed by suitable recycling means to the material source.

A benefit of the method of the present invention is that it allows automatically to draw samples within a short period of time, for example within ten seconds, ensuring that a minimum amount of powdery or particulate material collects on the disk shaped die rotor, the tablet stripper or the tablet discharge path. Control means for actuating the loading means upstream of the second compression station is eliminated.

As mentioned above, the material for the second layers is loaded into the die bores also during the drawing of samples. As a result of the first layers having been removed, the material for the second layers will be compressed for a somewhat reduced amount in the second compression station so that there is a risk of residual material remaining in the die bores after the ejection step or crumbled-off material collecting on the die rotor or in other areas of the pressing machine. In accordance with the present invention it may be provided that the second layers are also compressed more than during the normal manufacturing process during the drawing of samples.

The method of the present invention requires an intermediate discharge station wherein the first layer pressed articles may be removed and fed to inspection means.

In this connection a preferred embodiment of the present invention provides that the intermediate discharge station includes an adjustable ejection cam means, stripper means and two-way switch means arranged to discharge single-layer pressed articles selectively either to a scrap path or to an inspection station. The two-way switch means is in a position to discharge the pressed articles to the scrap path as long as a cam segment in the compression station and a cam segment for the ejection means have not yet reached new positions during the drawing of samples. In accordance with a further development of the present invention, the cams of the first compression station and the second compression station are adjusted synchronously. As a result thereof, some two-layer pressed articles will be compressed for an increased amount. These "over-compressed" two-layer pressed articles may be discharged into the scrap path by switch means at the discharge station. Undue pressurization of the pressing machine may be avoided by compression limiting means as known in connection with tablet or pellet pressing machines or by adjustment of the compression parameters (tablet thickness).

The cam segment of the first ejection station preferably is adjusted by solenoid drive means, for example by a spindle drive or the like.

BRIEF DESCRIPTION OF THE DRAWINGS

A preferred embodiment of the present invention will be described in more detail with reference to the accompanying drawings wherein.

DETAILED DESCRIPTION OF THE INVENTION

Figure 1:
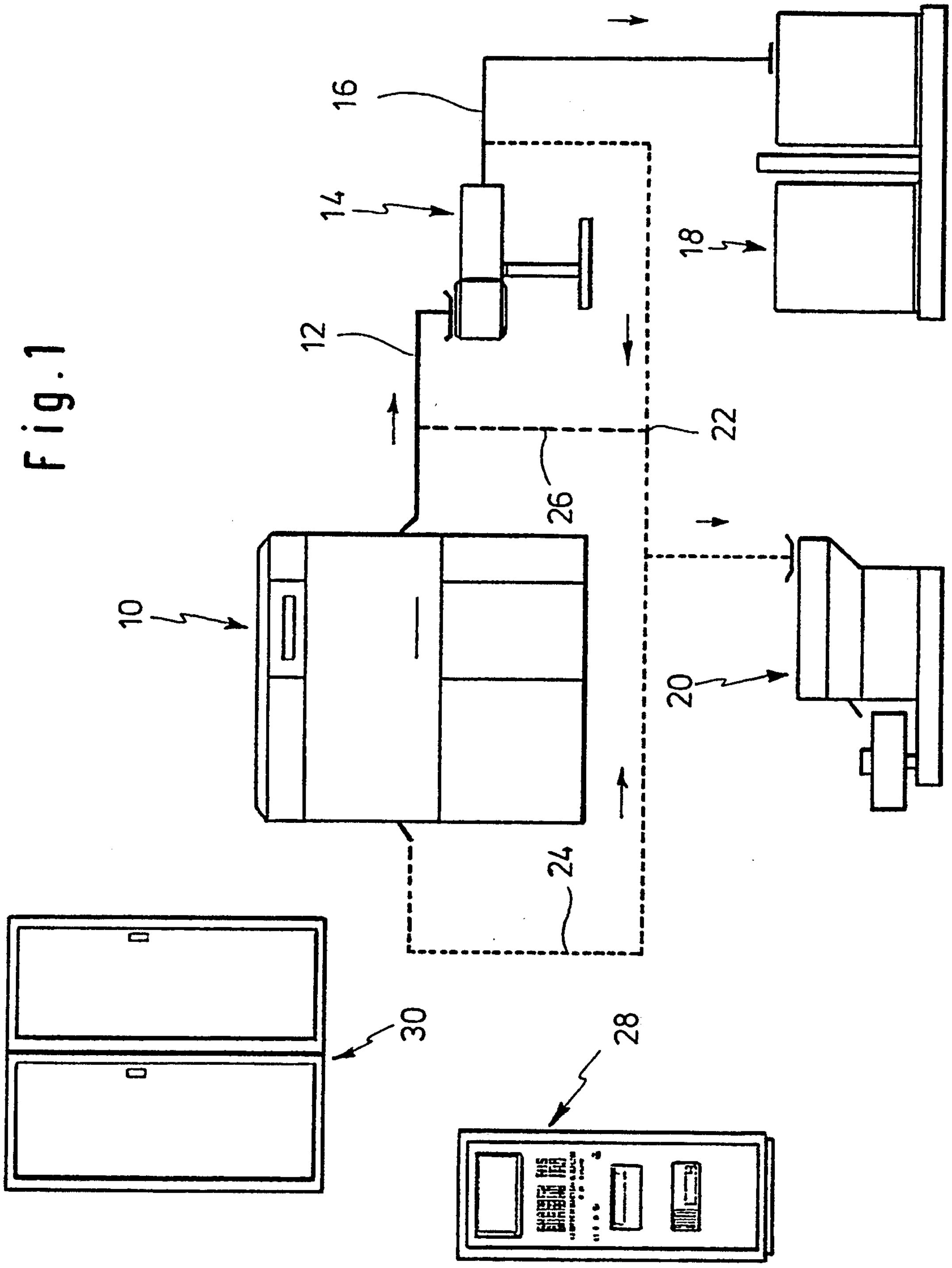
FIG. 1 is a schematic diagram of a system for making two-layer tablets or pellets.

FIG. 1 schematically shows a twin rotor pressing machine 10 for making two-layer tablets or pellets. Feeding means for feeding powdery or particulate material for making the tablets are not shown. The finished two-layer tablets are conveyed along a conveyor path 12 to an automatic dedusting and trimming device 14. From device 14 the finished tablets are conveyed along a conveyor path 16 to a loading device 18.

Associated with pressing machine 10 is an automatic inspection device 20 for inspecting in particular the weight of the tablets. A branch line 22 is branched-off from conveyor path 16 and extends to inspection device 20. During inspection periods, tablets are withdrawn from conveyor path 16 to be inspected by automatic inspection device 20. In FIG. 1 a further conveyor line 24 is indicated by dotted lines. This line 24 is intended to discharge first layers of the second layer tablets from the pressing machine 10 and to feed them to the inspection device 20. Finally, a conveyor line 26 also indicated by dotted lines is provided to feed second layers of the second layer tablets to the inspection device 20.

Operation of the system as shown and described is controlled by an operative computer 28 by means of a control cupboard 30.

Figure 2:
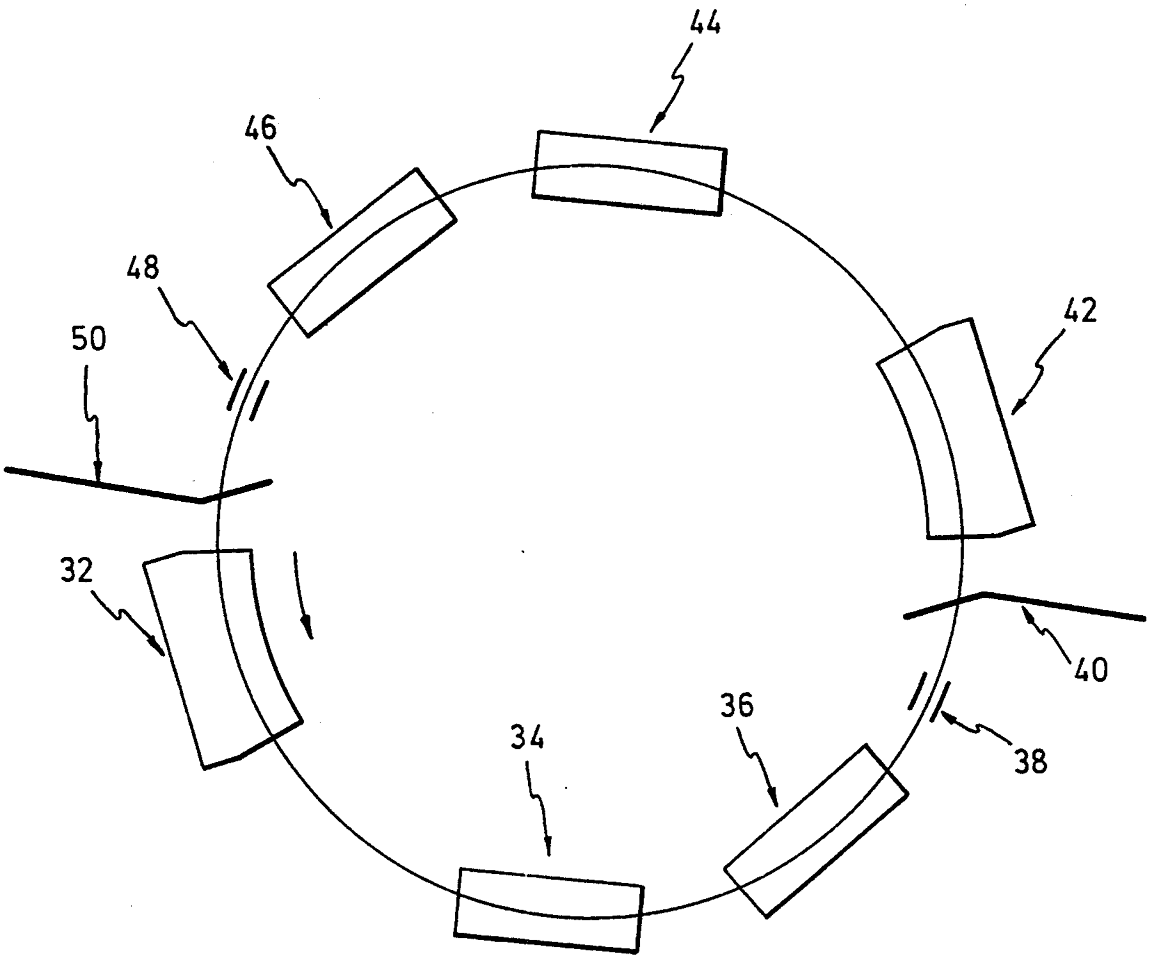
FIG. 2 is a schematic representation of a twin rotor pressing machine for performing the method of the present invention.

The basic design of the pressing machine 10 of FIG. 1 is schematically shown in FIG. 2. Powdery or particulate material for the first layers of the tablets are fed to a first loading station 32 wherein the material is loaded in metered quantities into die bores of a disk-shaped die rotor. A precompression station 34 provides for an initial compression of the first layers, and a second compression station 36 provides for the final compression of the first layers. Second compression station 36 is followed by an ejection station 38 which is inoperative during the normal process of manufacturing two-layer tablets. The same is true for an intermediate discharge station 40 disposed downstream of ejection station 38.

Powdery or particulate material for the second layers is fed into the die bores of the die rotor at a second loading station 42. A second precompression station 44 is provided to compress both layers in a first step, and a second final compression station 46 is provided for the final compression of the two layers. At a second ejection station 48 the finished two-layer tablets are discharged from the rotating die rotor, and they are removed at a discharge station 50 from where they are fed to the dedusting and trimming device 14 as mentioned with respect to FIG. 1.

The discharge stations 40 and 50 each are followed by two-way switch means adapted to be switched between a pair of positions. The switch means associated with intermediate discharge station 40 is arranged to discharge the single-layer pressed articles either to a scrap path (not shown) or to the inspection device 20. The switch means of discharge station 50 is arranged to discharge the pressed articles either to the dedusting and trimming device 14 or to a scrap path (not shown).

Figure 3:
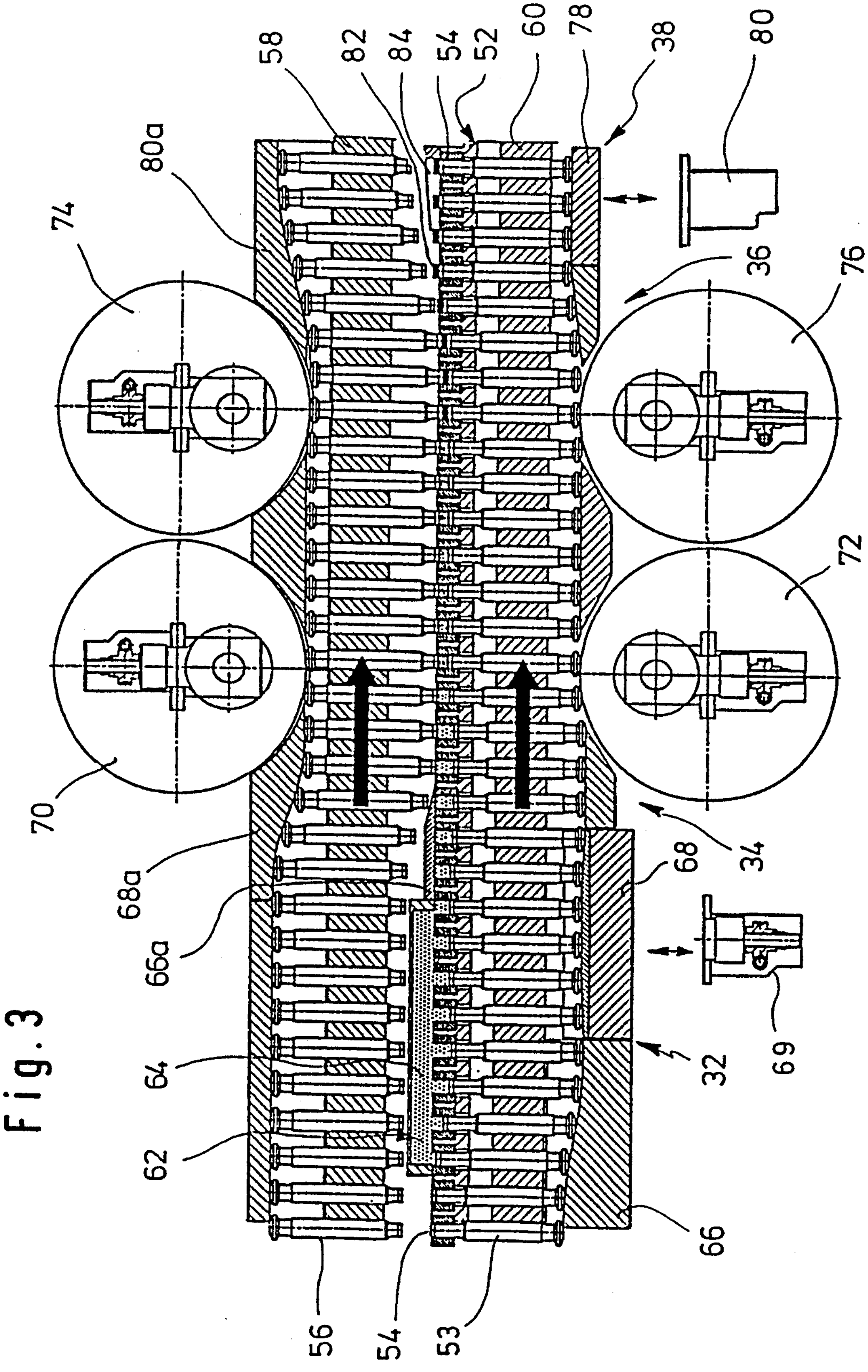
FIG. 3 is a more detailed side elevational view of the twin rotor pressing machine of FIG. 2 in the area for making the first tablet layers.

The structure of the pressing machine is shown in more detail in FIG. 3. A disk-shaped die rotor 52 which is driven to rotate about a vertical axis includes a row of circumferentially spaced die bores 54 extending through die rotor 52 parallel to the vertical axis of the rotor. Each die bore 54 is associated with a pair of compression plungers 54, 56. Upper compression plungers 56 are mounted for axial movement in a disk member 58 which is driven to be rotated synchronously with die rotor 52. In a similar manner lower compression plungers 54 are mounted for axial reciprocal movement in a disk member 60 which is also driven to be rotated synchronously with die rotor 52. The axial positions of plungers 53 and 56 are determined by cams cooperating with the ends of plungers 53, 56 facing away from disk rotor 52.

The first loading station 32 includes a loading device 62 (not described in more detail) which is disposed above die rotor 52 and which loads e.g. powdery material into the die bores 54 passing by. The loading depth is determined by the positions of the lower plungers 53 which initially pass by a stationary cam segment 66 and thereafter by a movable cam segment 68 arranged to be actuated by a solenoid adjusting device 69 (not described in more detail). The cam segment 68 defines the final positions of the lower plungers 53 which progressively withdraw from the die bores 54 while they are moving along the cam segment 66. Adjustment of the cam segment 68 allows to determine the loading depth and accordingly the metering of the quantity of material loaded into the die bores. A plate 66*a* following the loading device 62 and supported on disk rotor 52 prevents escape of material from die bores 54 until the upper plungers 56 cooperate with the die bores 54 by means of an upper cam segment 68*a* of precompression station 34. The precompression means of precompression station 34 are comprised of precompression rollers 70, 72 which determine the amount of compression of the material loaded into die bores 54. The final thickness of the pressed articles is determined by adjustable main compression rollers 74, 76 in the main compression station 36.

During normal operation for the manufacturing of the two-layer tablets material for the second layers is loaded into the die bores onto the first layers and is compressed in a manner similar to that as described with respect to the first layers. However, FIG. 3 indicates an operative condition where samples of the first layers of the two-layer tablets are withdrawn for inspection purposes. As shown in FIG. 3, a cam segment 78 is adjusted by means of solenoid adjusting means 80 such that the lower plungers 53 are displaced upwardly, while the upper plungers 56 are moved also upwardly by means of a cam segment 80*a*. As a result thereof, the first-layer pressed articles 82 are ejected above the upper surface of die rotor 52 from where they are laterally displaced by stripper means 84 towards intermediate discharge station 40. Similar ejection means are provided at discharge station 50. Normal operation of such a pressing machine for making two-layer tablets is known, and accordingly, it will not be described any further. In the following withdrawal of first layer samples for inspection purposes will be explained with reference to FIG. 4.

Figure 4:
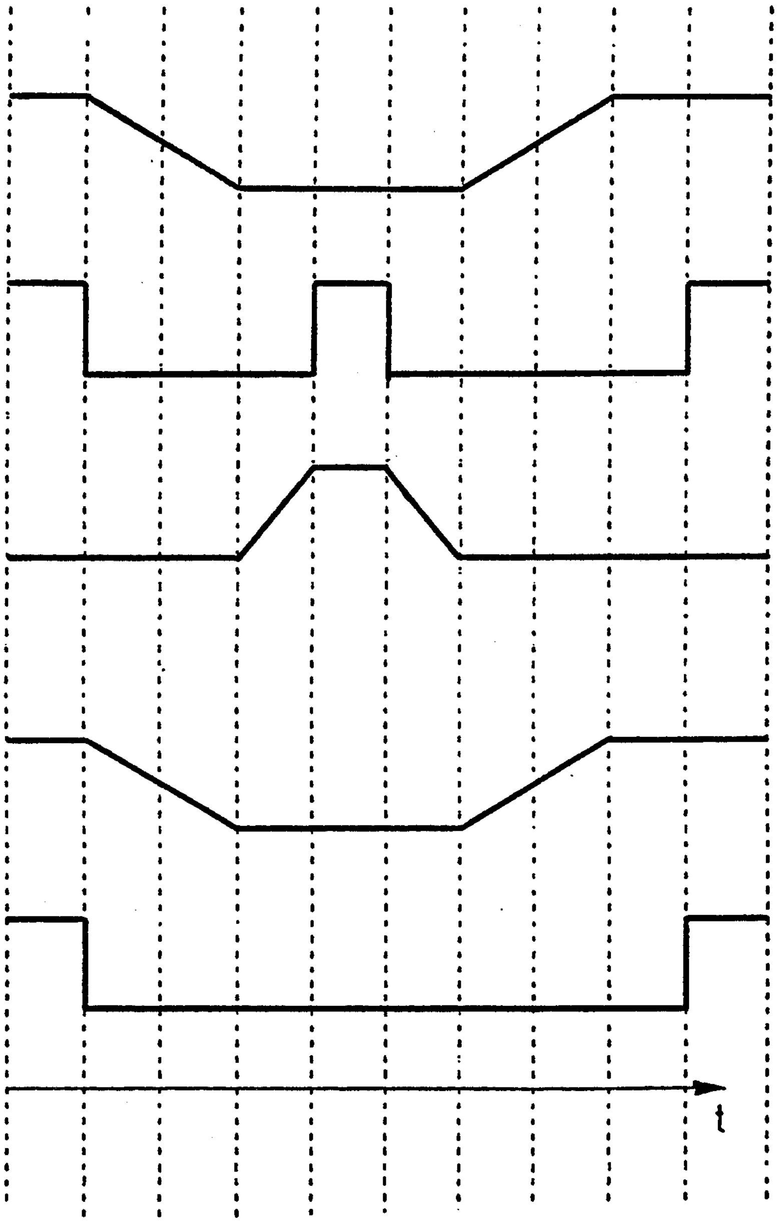
FIG. 4 is a time diagram for showing the functions of the various stations of the twin rotor pressing machine during the drawing of first layer samples.

In FIG. 4 the beginning of withdrawing samples is indicated. Prior to the beginning the compression stations 34, 36 and 44, 46 are adjusted by means of the compression rollers such that the desired depth of the first layers and of the combined first and second layers are obtained. The two-way switching means at the intermediate discharge station is in a position for discharging the pressed articles to the inspection device 20. Since, however, the ejection means at the ejection station 38 is inoperative, i.e. the first layer pressed articles are not ejected, the switching means of the intermediate discharge station is also inoperative. The two-way switching means at the discharge station 50 is in a position to discharge the two-layer pressed articles towards the dedusting and trimming device 14.

At the beginning of the period of withdrawing samples, provisions are made to reduce the thickness or depth of the pressed articles in the first and second compression stations 40, 50 by appropriate adjustment of the pressure rollers in the compression stations. At the same time, the switch means of the intermediate and final discharge stations are switched into positions for connection to the scrap path. If the desired thickness or depth is obtained at the compression stations, the adjusting means 80 adjusts cam segments 78 at the ejection station 38 towards the position as shown in FIG. 3. If the ejection position is obtained at the ejection station 38, the switching means of the intermediate discharge station is switched to a position so that the ejected first layer pressed articles may be fed along conveyor line 24 to the inspection device 20. When the withdrawal of samples has been terminated, the two-way switching means at the intermediate discharge station is reset to a position for discharge to the scrap path. At the same time the cam segment 78 is repositioned so that removal of first layer pressed articles is terminated. As soon as discharge station 36 has reached its operational condition, the thickness or depth to be obtained at the compression stations are readjusted to their original values. As soon as this has occurred, switch means in the main discharge station which was in a position for discharge towards the scrap path as mentioned above, is reset to a position in which the two-layer pressed articles are again conveyed along the normal conveyor path 12 to device 14.

If it is only the second layers which are to be inspected, it is merely necessary to eject the first layers in the above described manner and to discharge them to the scrap path. The single layer pressed articles ejected at the second ejection station 48 are conveyed along the conveyor path 12 and accordingly must be discharged by suitable switch means along conveyor line 26 to inspection device 20.

What is claimed is:

1. A method of making two-layer tablets or pellets in a twin rotor pressing machine, the method comprising the steps of:

a) feeding into die bores of a die rotor a first powdery or a first particulate material so as to form first layers;

b) compressing said first layers with a first compression force in a first step by plungers synchronously rotating with said die rotor so as to form first layer pressed articles;

c) feeding into said die bores including said first layer pressed articles a second powdery or second particulate material so as to form a second layer;

d) compressing commonly said first and said second layer in a second step with a second compression force by said plungers so as to form two-layer tablets or pellets;

e) removing said two-layer tablets or pellets from said bores at a main discharge station;

f) periodically subjecting the machine to an inspection period and during said inspection period:

(i) compressing said first layers with a third compression force larger than said first compression force so as to form said first article with increased compression;

ii) rejecting said first articles with increased compression through a rejection channel at an intermediate discharge station after said third compression force has been fully reached;

iii) removing said first layer pressed articles from said bores at said intermediate discharge station for inspection of said articles for one or more predetermined parameters;

iv) feeding into said die bores said second powdery or particulate material and compressing said second layer with a fourth compression force larger than said second compression force; and v) removing said compressed second layer articles from said die bores at said main discharge station for inspection of said second layer articles for one or more predetermined parameters, or rejecting said second layer articles, respectively, through a second rejection channel.

2. The method of claim 1 wherein the predetermined parameter is selected from the group consisting of weight and thickness.

3. A twin rotor pressing machine for performing the method of claim 1 comprising a die rotor adapted to be rotated and further comprising a plurality of die bores, each receiving a pair of reciprocable plungers, a first loading station at the periphery of the die rotor for feeding powdery or particulate material into said die bores, a first compression station for compressing the powdery or particulate material within said die bores by means of said plungers so as to form first layers pressed articles, said first compression station further comprising a first pre-compression station (34) and a first main compression station (36), an intermediate discharge station adapted to discharge first layer pressed articles, a second loading station for feeding powdery or particulate material into said die bores so as to form second layers adjacent said first layers, a second compression station for compressing said first and second layers so as to form two-layer tablets or pellets, said second compression station further comprising a second pre-compression station (44) and a second main compression station (46), ejection and discharge stations for ejecting and discharging said two-layer tablets or pellets, said plungers being adapted to be actuated from opposite sides of said die rotor by means of compression rollers mounted so as to be displaceable towards and away from said plungers by adjustment means, said compression rollers of said first and second compression stations (34, 36 and 44, 46, respectively) being arranged to be adjusted in timed relationship to each other, said intermediate discharge station further comprising adjustable ejection cam means, stripper means and two-way switch means arranged to discharge said first layer pressed articles during the inspection period selectively either to the scrap path or to the inspection station.

4. A twin rotor pressing machine in accordance with claim 3, wherein said compression rollers of said first and second compression stations (34, 36 and 44, 46 respectively), are arranged to be adjusted synchronously to each other.

5. A twin rotor pressing machine in accordance with claim 3, wherein said ejection cam means (78) of said intermediate discharge station is adjusted for ejection purposes only after the pressure roller of said first compression station (34, 36) has been displaced so as to compress said first layers during the inspection period.

6. A twin rotor pressing machine in accordance with claim 3, wherein said two-way switching means is arranged to be in a position discharging said pressed first-layer articles to said scrap path before said pressure rollers of said first compression station (34, 36) have been adjusted.

7. A twin rotor pressing machine in accordance with claim 3, wherein said two-way switching means is arranged to be switched into its position for discharging said pressed first-layer articles to the inspection station (20) only after the pressure rollers in said first compression station (34, 36) have been adjusted to a new position for effecting said increased compression.

8. A twin rotor pressing machine in accordance with claim 3, wherein said ejection station (38) includes a control piston segment (78) adapted to be actuated by a solenoid device (80).

* * * * *